Oct. 5, 1965   F. M. REISING   3,209,632
SLOTTING DEVICE
Filed Oct. 24, 1961
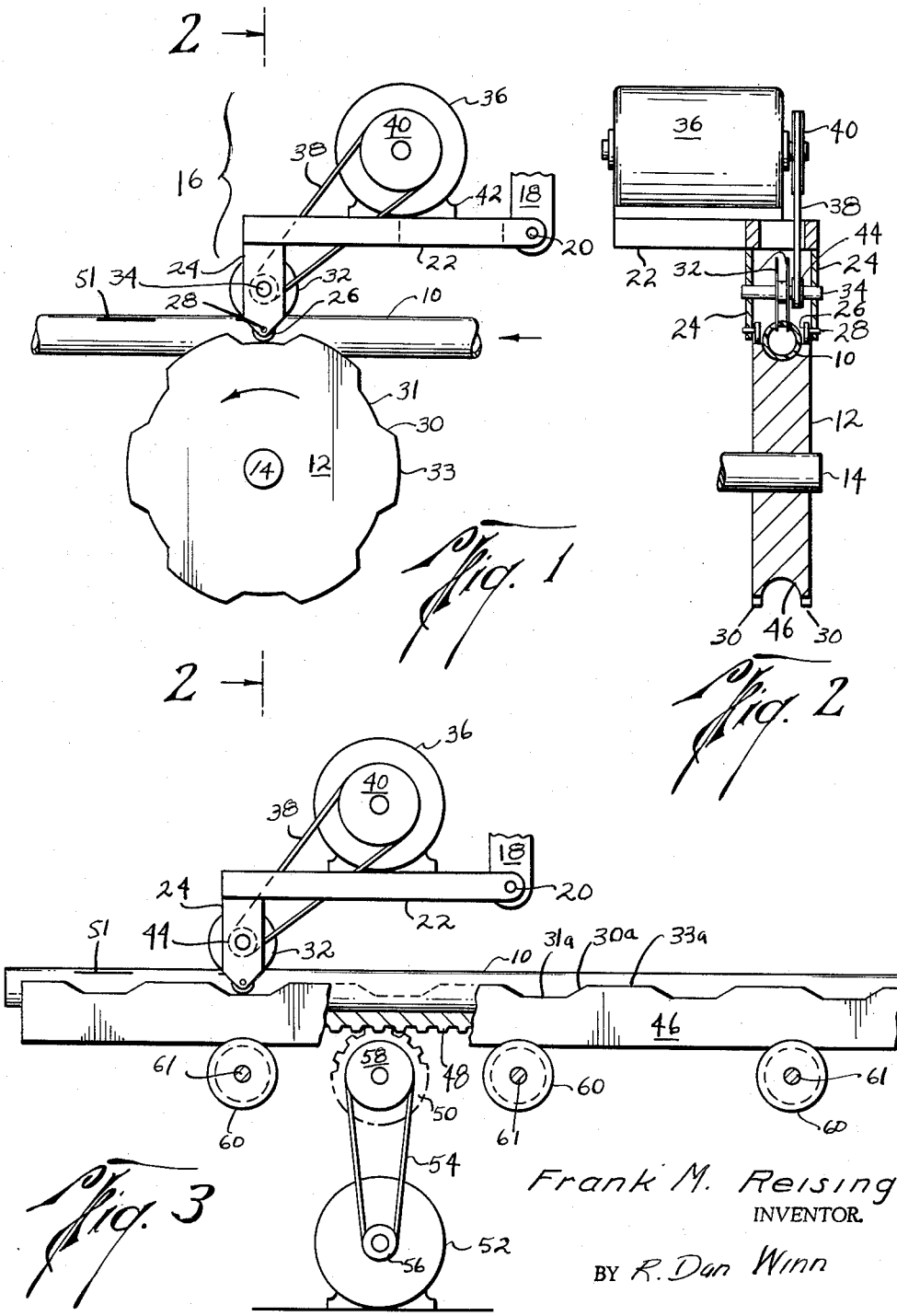
Frank M. Reising
INVENTOR.
BY R. Dan Winn
ATTORNEY United States Patent Office 3,209,632
Patented Oct. 5, 1965

3,209,632
SLOTTING DEVICE
Francis M. Reising, 310 W. Fay, Edinburg, Tex.
Filed Oct. 24, 1961, Ser. No. 147,304
1 Claim. (Cl. 83—310)

This invention pertains to automatic mechanical means for slotting materials, in particular to the contnuous cutting of slots at fixed intervals in plastic or metal tubing.

Because of the expense and difficulties of attempting to manufacture tubing of any kind with slots in the walls thereof, this particular invention has been developed to place these slots in the tubing after manufacture or in conjunction with the manufacture of the tubing after the tubing has been formed, or, in the flat stock before forming into tubing.

Conventional devices for slotting tubing made of plastic or light metal materials have proved unsatisfactory in large volume production applications because of the inability of the slotting devices to accurately measure and place the slots in the tubing relative to each other and to exercise a sufficient control in the length, width, and spacing of such slots as to insure uniformity in the large quantities necessary.

The subject invention overcomes the difficulties found in the conventional devices in that it is entirely automatic, automatically spacing the slots both longtudinally and laterally relative each other and combine a tubing handling function with the measurement and timing of the actuation of the slot cutting elements.

Briefly, the invention comprises a carriage device for movably supporting the tubing either in long single pieces or in continuous string. The embodiment of the device is shown in both ways, the second way being shown pertains to long pieces of tubing being carried in a sliding carriage which is power driven at a gven rate, the carrage element has camming surfaces on the outer upper edges thereof, which, through a cam follower, actuate a high speed slot cutting element, raising and lowering the same to cut slots in the pipe at the proper moments, and of the proper length and lateral spacing, as the carriage and tubing move forward under the slotting elements of the device. In the first embodiment shown, the tubing is brought to the invention in continuous string as it would emerge from an extrusion or other type of tubing manufacturing device, and the carriage-cam element is a large sheave or grooved wheel, disposed vertically to the longitudinal axis of the tubing being supported and slotted. In this configuration, the large sheave or wheel has, on this outer upper surfaces or rims, the camming surface so designed as to actuate the slotting element itself through the cam follower which movably engages the camming surfaces on the upper rims of the large sheave or carriage member. This raises and lowers the high speed cutting wheels of the slotting element at measured intervals as the pipe moves over the carriage device, automatically coordinating the movement of the slotting machine to the movement of the pipe. Obviously, the variations in speed at which the tubing moves through the device does not affect the spacing of the slotting machine as the control of the spacing of the slots cut, and the length thereof, is entirely controlled by the angular speed of the carriage-cam wheel. Because of the grooved edge configuration of the carriage wheel, there is little or no slippage between the tubing and the carriage wheel and therefore the longitudinal spacing of the slots is obtained with a high degree of accuracy. The lateral spacing is fixed by the distance between the cutting wheels. The actual slotting is accomplished by high speed cutting wheels which, with its driving motor is mounted on a rockably mounted frame, is supported at its front end by the cam follower. The motor drive gives sufficient weight to the cutting wheels when the same is lowered to contact the tubing when the cam follower rides down into the depression of the cam surface or the carriage-cam wheel. In the two embodiments shown, two cutting wheels are shown but may be any number depending upon the diameter of the tubing or, if not cutting a rounded surface, may be limited only by the width of the strip to be slotted moving over the carriage camming wheel or being moved by the slidable carriage, as the case may be.

FIGURE 1 is a side view of one of the preferred embodiments of the device.

FIGURE 2 is a vertical cross-sectional and partially perspective view of the carriage-cam wheel and the forward portions of cutter element.

FIGURE 3 shows another preferred embodiment of the device being a side view thereof, partially broken away.

Referring now to FIGURE 1, tubing 10, moving from right to left, moves over and in contact with carriage-cam wheel 12 which is rotatably mounted on horizontal shaft 14. The cutting element, shown generally as 16, is rockably mounted on support 18 by means of horizontal shaft 20. Cutting element frame 22 is supported at its forwardmost end by cam followers 24 which have disposed on their lower ends rollers 26 mounted on roller shafts 28. Roller 26 is in contact with camming surface 30 of carriage-cam wheel 12. Cutting wheel 32 is mounted on cross-shaft 34. Motor 36 drives cross-shaft 34 by means of belt 38 and motor pulley 40. Motor 38 is fixedly attached to cutter element frame 22 by base 42.

Referring now to FIGURE 2, cutter element frame 22 has attached thereto cam followers 24 which in turn support cross-shaft 34, and fixedly attached thereto are cutter wheels 32. Cross-shaft 34 is driven by belt 38 on pulley 44 which is also fixedly attached to cross-shaft 34. Tubing 10 is disposed in the groove 46 of carriage-cam wheel 12 which is in turn mounted on shaft 14. Cam rollers 26 are both supported on cam roller shafts 28, and ride on the outer camming surfaces 30 of carriage-cam wheel 12, which camming surfaces have depressions 31 and ramps 33.

Referring now to FIGURE 3, the cutter element 16 is shown as the same as those shown in FIGURES 1 and 2, but cam rollers 26 roll against and are supported on upper camming surfaces 30a of longitudinal carriage 46. Shown in the broken away portions in the middle of slidable longitudinal carriage 46, is the rack 48 attached to the lower surface thereof which engage pinion 50 which is in turn driven by main drive motor 52 through the means of belt 54 and pulleys 56 and 58. Slidable carriage 46 is supported upon bogey wheels 60 which are in turn supported on bogey shafts 61. Tubing 10 lies in a trough formed for that purpose in the sliding carriage 46 between upper camming surfaces 30a.

In operation, tubing 10 moves over carriage-cam wheel 12 causing the same to rotate, or the carriage wheel may be driven by some other means, causing the outer camming surfaces 30 of carriage-cam wheel 12 to movably engage cam rollers 26 of cam followers 24. This raises and lowers cutting element 16 and, in particular, cutting wheels 32, which in turn accomplishes the slotting of tubing 10 at exactly spaced apart intervals and lengths when the cam followers 24 ride into the depressions 31 or 31a of cam wheel 12 or carriage 46, the cutter element 16 and therefore the cutting wheels 32 engage the tubing and cut slots 51 in the same until the cutter element 16 is raised again by cam roller 26 riding up upon ramp 33 of the carriage-cam wheel 12. Substantially the same effect is obtained by using the slidable carriage 46, rolling forward or backward upon bogey wheels 60 and moved backwards and forwards by means of engagement of pinion 50 with rack 48 so that, when the cam roller 26 rides down into cam depression 31a of slidable carriage 46, cutting wheels 32 are lowered to and in contact with tubing 10 thereby cutting slots 51 in the same.

While a preferred embodiment of the invention has been shown and described, many modifications thereof may be made by one skilled in the art without departing from the true spirit of the invention, and it is intended to protect by Letters Patent all forms of the invention falling within the scope of the following claims.

I claim:

An apparatus for continuous cutting of slots in elongate tubular material comprising:
- an orbiculate shaped cam wheel with ramps and indentations about the outer periphery thereof,
- a groove being provided about said cam wheel to tangentially receive an elongate tubular member and permit lineal movement of said tubular member upon the rotation of said cam wheel,
- a cam follower pivotably mounted to ride the outer periphery of said cam wheel and be oscillated thereby so that a predetermined sequence of oscillations are continuously and periodically repeated,
- a cutting wheel rotatably mounted on said cam follower and adapted to be oscillated therewith,
- means for rotating said cutting wheel, the oscillating of said cutting wheel caused by the rotation of said cam wheel and the attendant oscillation of said cam follower causing said cutting wheel to intermittently contact the surface of said tubular member moving through the groove of said cam wheel and cut slots therein, the length and spacing of said slots being determined by the relative positioning and number of said ramps and indentations on said cam wheel.

References Cited by the Examiner

UNITED STATES PATENTS

| | | | |
|---|---|---|---|
| 964,162 | 7/10 | Jenkins | 83—315 X |
| 1,027,558 | 5/12 | Meyers | 90—15 X |
| 2,319,198 | 5/43 | Barrans et al. | 83—315 X |

FOREIGN PATENTS

| | | |
|---|---|---|
| 599,340 | 3/34 | Germany. |

WILLIAM W. DYER, JR., *Primary Examiner.*